June 28, 1960

D. L. BOGUE 2,942,673

PROPELLER CONTROL

Filed Nov. 22, 1957

INVENTOR.
David L. Bogue
BY
Paul Fitzpatrick
ATTORNEY

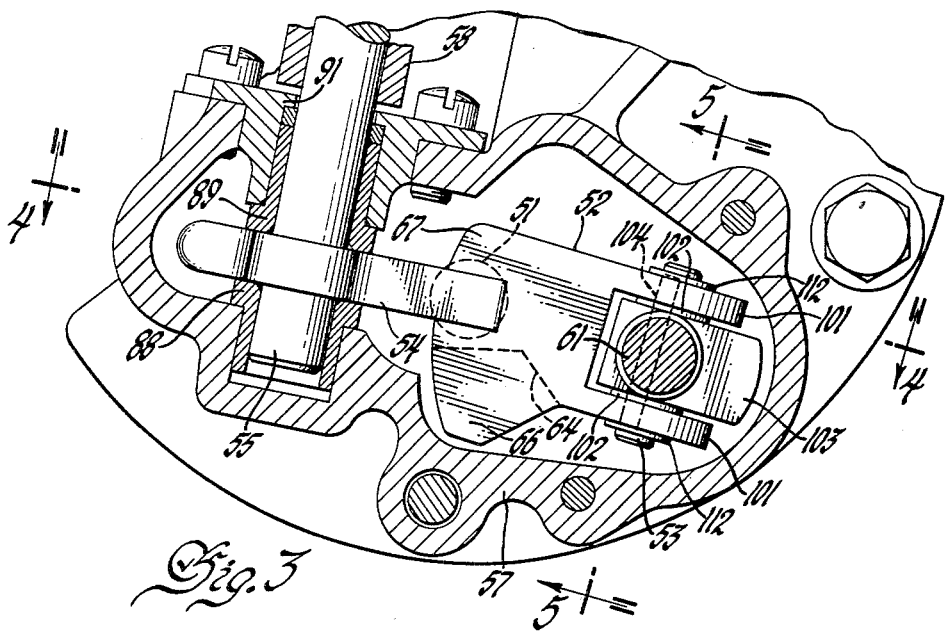
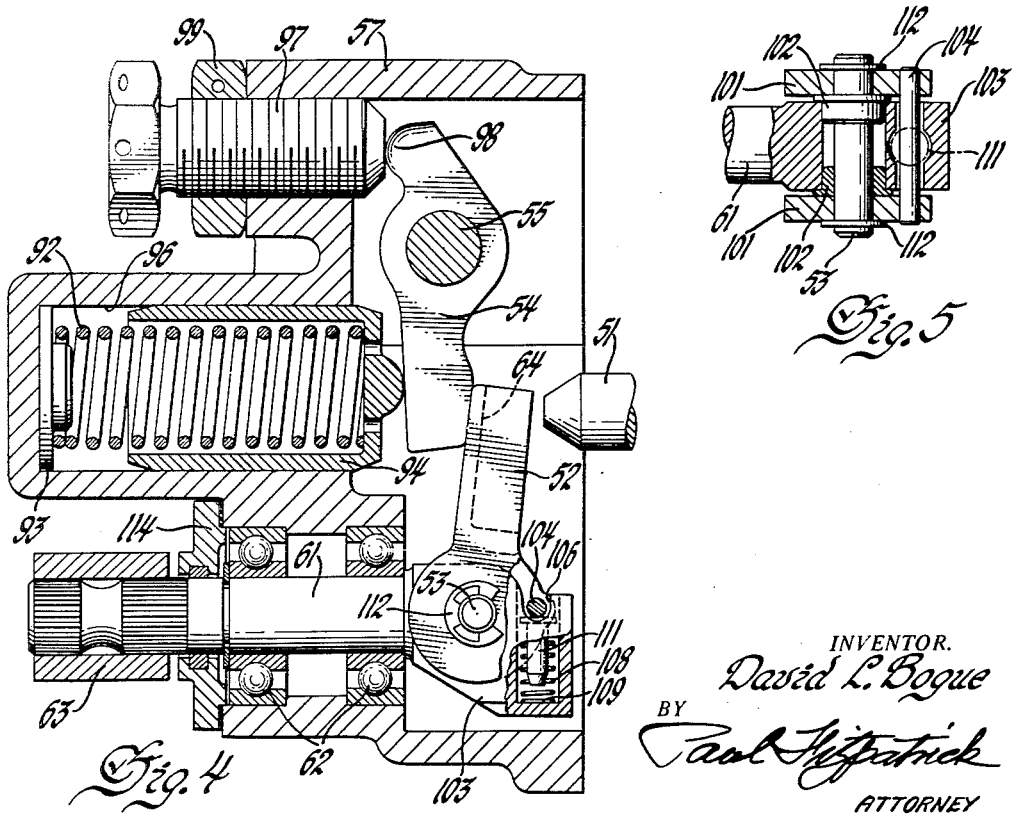

June 28, 1960 D. L. BOGUE 2,942,673
PROPELLER CONTROL
Filed Nov. 22, 1957 3 Sheets-Sheet 3

INVENTOR.
David L. Bogue
BY
Paul Kilpatrick
ATTORNEY

United States Patent Office 2,942,673
Patented June 28, 1960

2,942,673

PROPELLER CONTROL

David L. Bogue, Jupiter, Fla., assignor to General Motors Corporation, Detroit, Mich., a corporation of Delaware Filed Nov. 22, 1957, Ser. No. 698,249

5 Claims. (Cl. 170—135.72)

This invention relates primarily to control of aircraft propellers. In modern propeller type power plants including gas turbine engines, it has been found to be highly desirable to use propellers which are capable of pitch varying movement over the entire range from negative pitch, used principally for braking the aircraft, through positive pitch values used normally for propulsion, to a feathered condition. It is also desirable to provide mechanism which will automatically vary propeller pitch toward the feathered condition in the event of a reversal of power between the engine and propeller. This is provided to prevent high drag on the aircraft resulting from a windmilling propeller driving the gas turbine engine if the engine should fail for any reason.

Under certain conditions, however, the mechanism which increases pitch in response to a power reversal or negative torque condition may prevent blade pitch reversal. For example, after a plane has touched down in landing with the propeller in a positive blade angle condition, if the pilot operates his control to reverse the propeller pitch, the propeller may run ahead of the engine as the pitch is decreased. If the reverse torque value is high enough to actuate the automatic sensing mechanism, it will signal the propeller to feather and thereby override the pilot's demand for reversed pitch. It will be understood that the propeller may not feather fully, but it will increase pitch toward the feathered condition until the torque reversal is terminated. Such partial feathering is referred to herein as feathering.

This invention is directed to an improvement in aircraft propeller control systems which eliminates this conflict and thereby eliminates the possibility that braking by the propeller will be unavailable upon landing the aircraft.

Essentially, the invention comprises means responsive to the control movement by the pilot calling for reverse pitch which disables or inactivates the automatic means which would otherwise increase pitch in response to a reversal of torque.

The nature of the invention and the advantages thereof will be apparent to those skilled in the art from the succeeding detailed description of the preferred embodiment of the invention and the accompanying drawings thereof.

Figure 3 is a sectional view of a disabling mechanism taken in a plane substantially perpendicular to the propeller shaft axis.

Figure 4 is a sectional view of the same taken on the plane indicated by the line 4—4 in Figure 3, with parts cut away.

Figure 5 is a detail sectional view taken on the plane indicated by the line 5—5 in Figure 3.

Figure 1:
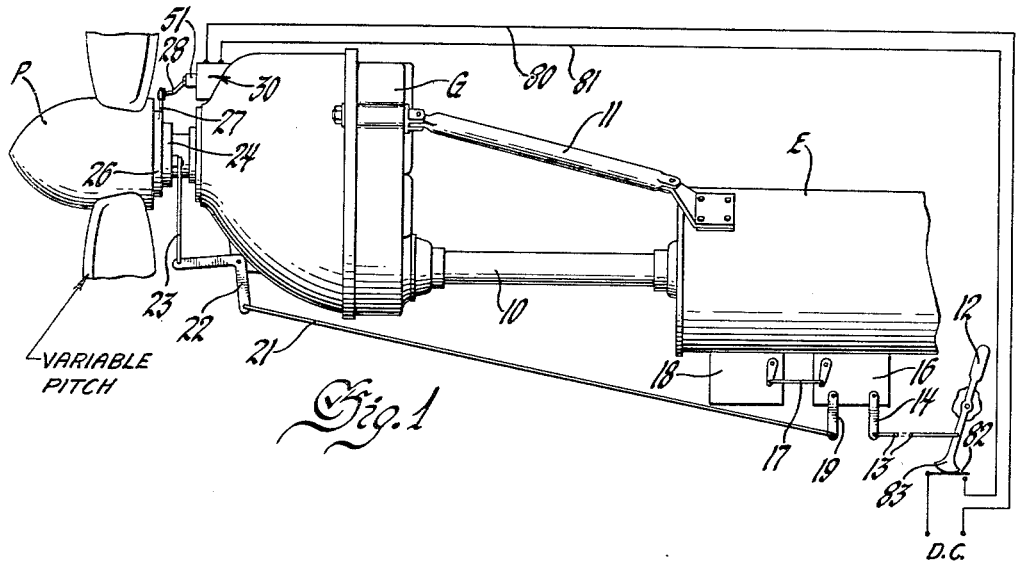
Figure 1 is a schematic drawing of a gas turbine propeller aircraft power plant embodying the control system of the invention.

Referring first to Figure 1, there is illustrated an aircraft power plant comprising a variable pitch propeller P mounted on a reduction gear assembly G driven by gas turbine engine E. The engine is connected to the reduction gear by a shaft housing 10 and two struts 11 as described in U.S. Patent No. 2,718,756. The engine and propeller are controlled by a pilot's power control lever 12 connected by suitable mechanical linkage 13 to the input arm 14 of a coordinating control 16. The coordinating control is connected by linkage 17 to an engine fuel control 18. The coordinating control is also connected by a linkage 19, 21, bellcrank 22 mounted on the reduction gear case, and link 23 to a control input of the propeller. This linkage is illustrated schematically. A linkage of this sort is described in U.S. Patent No. 2,860,712, 1952. The details of the linkage are immaterial to an understanding of the present invention.

The propeller may be of known type, such as that described in U.S. patent application Serial No. 485,921, filed February 3, 1955. The propeller includes mechanism for operation as a speed governing propeller, with blade angle determined by a governor, to hold a set propeller speed and also includes mechanism by which the propeller blades may be varied in direct blade angle control from a negative pitch value through zero pitch and a positive pitch range with blade angle determined by a control input. It also includes mechanism by which the propeller may be feathered. The control mechanism in the propeller may be referred to as "pitch varying means." The propeller includes two control rings which are mounted in a non-rotating part of the propeller hub and which are connected to the hydraulic pitch varying means within the rotating part of the propeller. As shown generally in Figure 1, there is a condition control ring 24 having an arm connected to link 23 by which the mode of operation of the propeller, such as positive or negative pitch in fixed blade angle control, or speed governing operation, is selected. This condition input is operated directly by the pilot's power lever 12 through the coordinating control 16 and the linkage previously described.

The propeller has a second control input ring 26, which may be referred to as the feather input ring. An arm 27 extending from this ring is connected by a link 28 to feathering control mechanism indicated generally as 30 on Figure 1. This feathering control mechanism, to be described later, may rotate control ring 26 to cause propeller pitch to increase toward or to the feathered condition.

The link 28 is actuated to cause the propeller to feather by various mechanisms, one of which responds to a power or torque reversal between the propeller and the engine. A mechanism responsive to torque reversal is described in U.S. patent application Serial No. 544,995. The mechanism is illustrated in Figure 6 in sufficient detail to explain its relation to the present invention.

Figure 6:
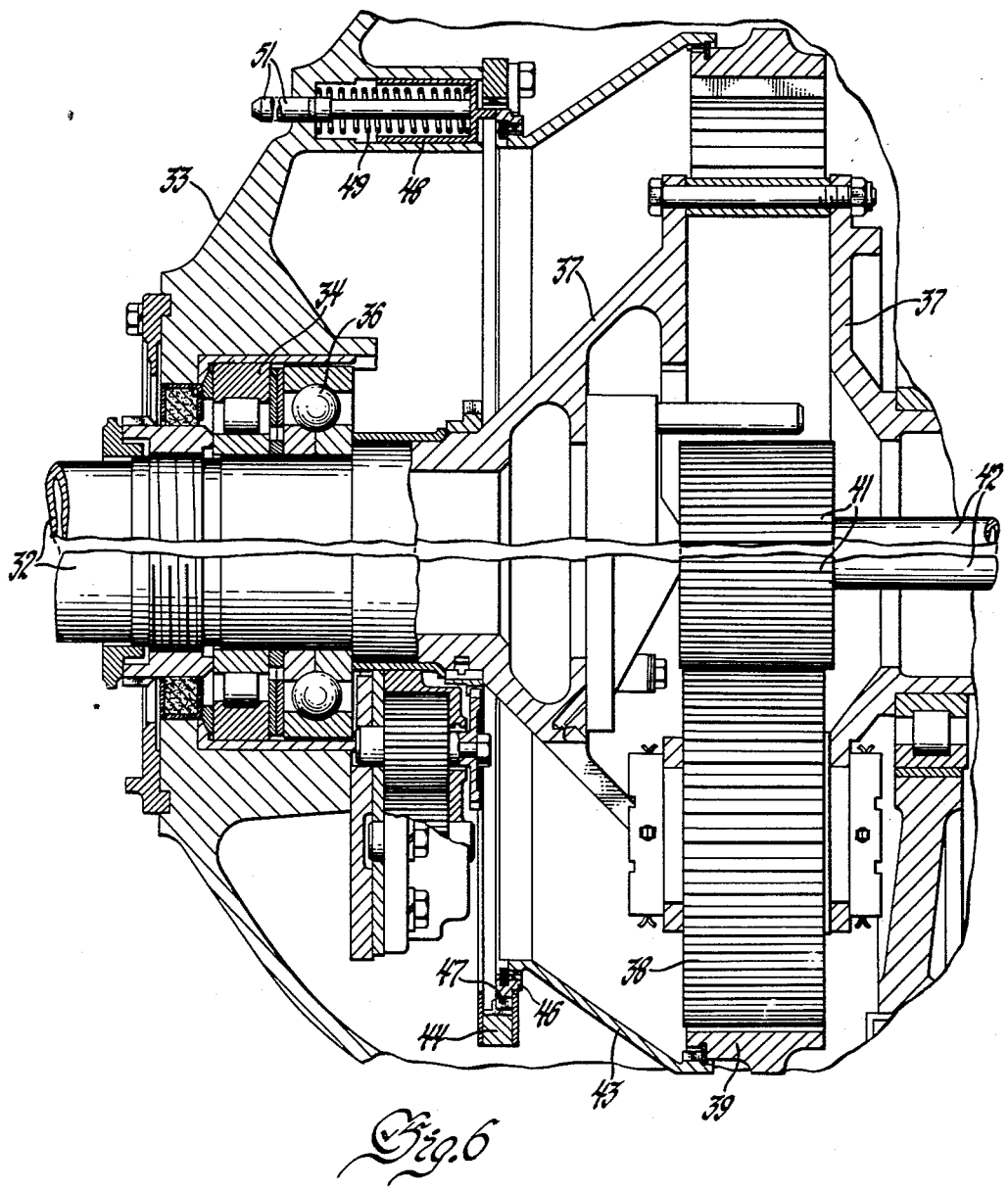
Figure 6 is a sectional view of a portion of the reduction gear assembly, taken on a plane containing the axis of the propeller shaft, illustrating the mechanism responsive to power reversal.

Referring to Figure 6, the propeller shaft 32 is mounted in the nose portion 33 of a reduction gear case by bearings 34 and 36. The planet carrier 37 rotating with the propeller shaft carries planet gears 38 meshing with a non-rotating ring gear 39. The planet gears are driven by sun gear 41 on shaft 42. The ring gear 39 is carried by a ring 43 which, in turn, is supported in a mounting ring 44 fixed in the reduction gear case. The portion 46 of ring 43 is coupled to the fixed support 44 by helical splines 47 which are so pitched that when the propeller tends to overrun the engine, and thus supplies power to the engine through the reduction gear, the ring gear 39 and ring 46 tend to move forwardly on the splines 47. This forward movement is opposed by a ring of plungers 48 biased rearwardly by compression springs 49 which normally hold the ring 46 at its rearward limit of movement. If the negative torque exceeds the value which is sufficient to compress springs 49, the plungers 48 move forward. When this occurs, one of the plungers 48 moves a push rod 51 forwardly. Push rod 51 extends through the nose of the reduction gear case and is coupled through mechanism to be described to link 28 and control ring 26. The foregoing description of the torque responsive mechanism is sufficient for an understanding of the present invention, details thereof immaterial to the present invention being omitted in the interest of conciseness.

The front end of push rod 51 is shown in its retracted position in Figure 4. When the push rod moves forward, it may engage an intermediate member or interposer 52 pivotally mounted on a pin 53 and rotate interposer 52 counterclockwise, as viewed in Figure 4. Member 52 bears against a rocker arm 54 integral with or fixed on a shaft 55. Shaft 55 is mounted in a control assembly housing 57 (see also Figure 2) bolted to the nose portion 33 of the reduction gear case. A bellcrank 58 is fixed on the upper end of shaft 55 which extends from the housing 57. A forwardly projecting arm of the bellcrank is coupled to link 28 by a commercial ball joint rod end 59.

Figure 2:
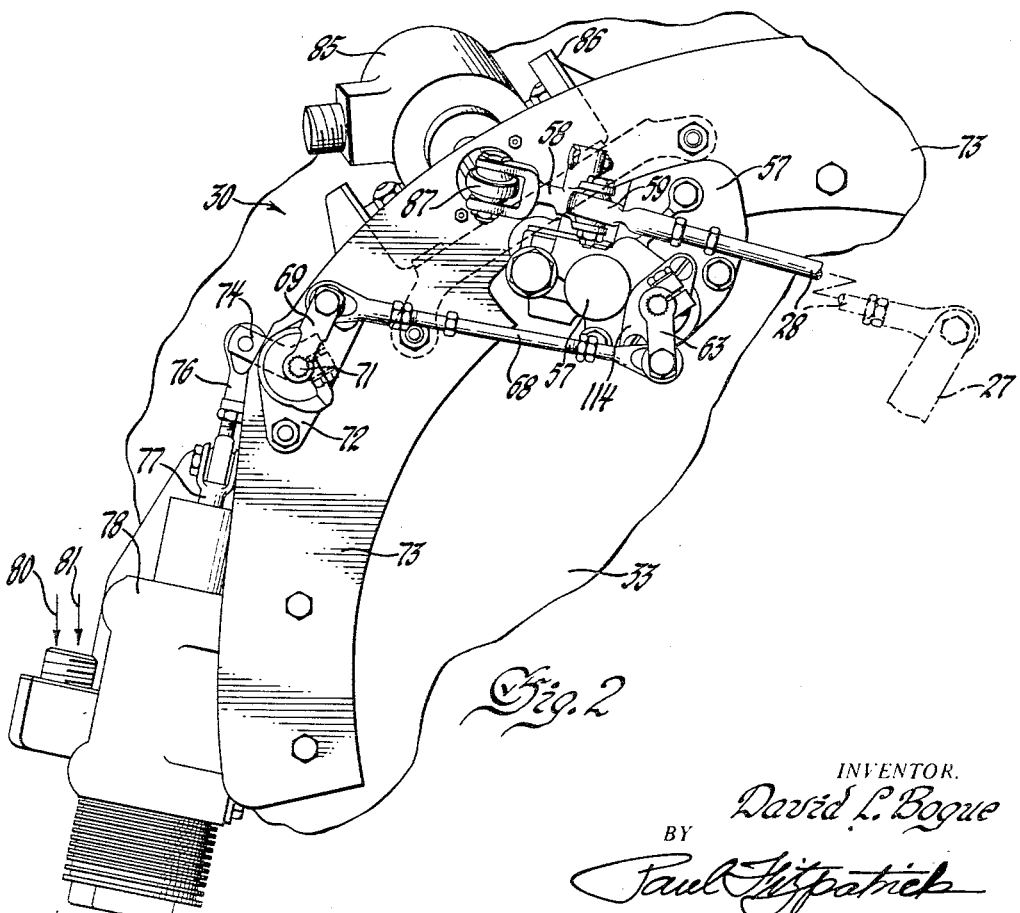
Figure 2 is a partial view of the front end of the reduction gear of the engine.

In the normal operation of the negative torque feathering system, when the plunger moves forward it acts through member 52 and rocker arm 54 to rotate shaft 55 and pull link 28 to the left, as viewed in Figure 2. This actuates a pitch increasing mechanism in the propeller which moves it toward the feathered condition.

The member 52 comprises a part of means for disabling this negative torque signal input to the propeller. The pivot pin 53 for member 52 is mounted on a shaft 61 supported by bearings 62 in the housing 57. An arm 63 mounted on shaft 61 may be operated to swing member 52 clockwise, as viewed in Figure 3, from its normal position in which it transmits movement from push rod 51 to rocker arm 54. The member 52 has a recess 64 cut in the lower portion so that the lower portion 66 of the outer end of member 52 is of relatively small thickness and the upper portion 67 is of relatively great thickness. When the member 52 is swung upwardly, plunger 51 may make its full travel without affecting rocker arm 54, so that no feathering signal is transmitted to the propeller.

To effect this disabling operation, arm 63 is connected by an adjustable link 68 with ball joint rod ends to an arm 69 on a rocker shaft 71 rotatably mounted in a support 72. Support 72 is mounted on a plate 73 bolted to the nose of the reduction gear case. An arm 74 fixed on rocker shaft 71 is coupled by link 76 to the movable member 77 of a commercial solenoid type actuator 78. Actuator 78 is energized by leads 80 and 81 from a suitable current source, indicated in Figure 1 as suitable source of direct current, through a normally open switch 82 closed by the pilot's power control lever 12. As indicated schematically, switch 82 is closed by a cam 83 on lever 12 which closes the switch whenever the control lever 12 is in the range in which the propeller blade angle is fixed, which includes the reverse thrust range. In the flight range in which the propeller operates under control of a speed governor, switch 82 is open. Thus, in the flight range, including the flight idle setting employed during landing of the airplane, member 52 is in the normal position shown in Figure 3 and the negative torque feathering system is operative. When the power control lever is moved back into the fixed blade angle range, solenoid 78 is energized to rotate member 52 to the position which disables the reverse torque feathering system.

It may be also noted, although it is not of moment to the present invention, that propeller control ring 26 may also be moved to its feathering position in response to an electrical signal transmitted to a solenoid actuator 85 mounted on a bracket 86 fixed to plate 73. The link 87, which is pulled rearwardly by the solenoid 85 when it is energized, is connected to one arm of bellcrank 58. Thus, when this solenoid is energized, link 28 is pulled to the left, as viewed in Figure 2. When shaft 55 is rotated by push rod 51, the movable part of the solenoid 85 is moved by it.

The foregoing describes in general the nature and operation of the control system of the invention. Certain features of the preferred structure of the control, as illustrated in Figures 3 to 5, may now be considered. The shaft 55 is mounted in bushings 88 and 89 mounted respectively in the body of housing 57 and in a cover plate 91 fixed to the housing. The rocker arm 54 is biased by a compression spring 92 bearing against a fixed abutment 93 and a slidable tappet 94 mounted in a bore 96 in housing 57. Spring 92 normally maintains shaft 55 in the position in which it does not transmit the feathering signal to the propeller. This normal position may be adjusted by a stop screw 97 bearing against end 98 of rocker arm 54. Screw 97 is threaded into housing 57 and bears a jamb nut 99.

Interposer 52 has a forked end defined by legs 101 which straddle the rear end of shaft 61. Pivot pin 53 passes through bores in the legs 101 and through bushings 102 fitted in a bore in the enlarged end portion 103 of shaft 61. A cross pin 104 pressed into the legs 101 extends with clearance through a slot 106 in portion 103. A compression spring 108 mounted in a bore 109 in the portion 103 bears against a headed pin 111 which engages the cross pin 104. Spring 108 exerts a light biasing force on interposer 52 to hold it in engagement with rocker arm 54. Pivot pin 53 is retained in place by contracting snap rings 112.

A cover plate 114 bolted to the housing 57 covers the bearings 62 for shaft 61.

It will be apparent from the foregoing that the preferred structure of the disabling device illustrated in Figures 3 to 5 is particularly well adapted to its purpose. It is simple, easy to maintain and adjust, and light and compact.

It will also be apparent from the foregoing description in general of the preferred embodiment of the invention that the invention provides a simple and reliable solution to the problem of possible interference between the pilot's signal for reverse pitch and the negative torque responsive system's demand for movement toward feathering.

The detailed description of the preferred embodiment of the invention for the purpose of explaining the principles thereof is not to be construed as limiting or restricting the invention, as many modifications may be made by the exercise of skill in the art.

I claim:

1. In combination, an engine, a propeller driven thereby including pitch varying means operable to reverse propeller pitch and to feather the propeller, manually operable control means connected to the propeller pitch varying means operable to cause the propeller to reverse pitch, automatic feathering control means, interconnecting means connecting the automatic feathering control means to the pitch varying means operable by the automatic feathering control means to cause the propeller to feather, means for disabling the interconnecting means, and means connecting the manually operable control means to the disabling means effective to operate the disabling means when the manually operable control means is moved to a position effective to reverse propeller pitch.

2. In combination, an engine, a propeller driven thereby including pitch varying means operable to reverse propeller pitch and to feather the propeller, manually operable control means connected to the propeller pitch varying means operable to cause the propeller to reverse pitch, means responsive to a power reversal between the engine and propeller, interconnecting means connecting the responsive means to the pitch varying means operable by the responsive means to cause the propeller to feather upon power reversal, means for disabling the interconnecting means, and means connecting the control means to the disabling means effective to operate the disabling means when the control means is moved to a position effective to reverse propeller pitch.

3. In combination, an engine, a propeller driven thereby including pitch varying means operable to reverse propeller pitch and to feather the propeller, manually operable control means connected to the propeller pitch varying means operable to cause the propeller to reverse pitch, automatic feathering control means, interconnecting means connecting the automatic feathering control means to the pitch varying means operable by the automatic feathering control means to cause the propeller to feather comprising a movable input member connected to the automatic feathering control means, an intermediate member, and an output member, the intermediate member being disposed between the input and output members, a control member supporting the intermediate member, a pivotal connection between the control and intermediate members providing for movement of the intermediate member by the input member, means for disabling the interconnecting means comprising means pivotally mounting the control member for rotation about an axis normal to the first pivotal connection providing for movement of the intermediate member transversely to the direction of reciprocation of the input member, the intermediate member having portions of relatively great and relatively small thickness selectively interposable between the input and output members by transverse movement of the input member, and means connecting the manually operable control means to the control member effective to operate the disabling means when the manually operable control means is moved to a position effective to reverse propeller pitch.

4. A motion-transmitting mechanism including disabling means comprising, in combination, a movable input member, an intermediate member, and an output member, the intermediate member being disposed between the input and output members, a control member supporting the intermediate member, a pivotal connection between the control and intermediate members providing for movement of the intermediate member by the input member, and a pivotal mounting for the control member normal to the first pivotal connection providing for movement of the intermediate member transversely to the direction of movement of the input member, the intermediate member having portions of relatively great and relatively small thickness selectively interposable between the input and output members by the said transverse movement of the intermediate member.

5. A motion-transmitting mechanism including disabling means comprising, in combination, a reciprocable input member, an intermediate member, and an output member, the intermediate member being disposed between the input and output members, a control member supporting the intermediate member, a pivotal connection between the control and intermediate members providing for movement of the intermediate member by the input member, a pivotal mounting for the control member normal to the first pivotal connection providing for movement of the intermediate member transversely to the direction of reciprocation of the input member, the intermediate member having portions of relatively great and relatively small thickness selectively interposable between the input and output members by transverse movement of the intermediate member, and means resiliently biasing the intermediate member against the output member.

References Cited in the file of this patent
UNITED STATES PATENTS

| | | |
|---|---|---|
| 2,605,849 | Bordelon | Aug. 5, 1952 |
| 2,667,935 | Woodward | Feb. 2, 1954 |